UNITED STATES PATENT OFFICE.

JOSEPH MORLEY, OF BUTTE, MONTANA, ASSIGNOR OF ONE-FOURTH TO JOSHUA F. McQUEEN AND ONE-FOURTH TO ALMA JONES, BOTH OF BUTTE, MONTANA.

COFFEE-CLEARING COMPOUND AND PROCESS OF MAKING SAME.

1,151,373. Specification of Letters Patent. Patented Aug. 24, 1915.

No Drawing. Application filed June 27, 1913. Serial No. 776,095.

*To all whom it may concern:*

Be it known that I, JOSEPH MORLEY, a citizen of the United States, and a resident of Butte, in the county of Silverbow and State of Montana, have invented a new and Improved Coffee-Clearing Compound and Process of Making Same, of which the following is a full, clear, and exact description.

This invention relates to an improved composition of matter or compound for the purpose of clearing coffee previous to drinking the same, and the invention has for its object the provision of a compound of the above character which will considerably improve the appearance and taste of the coffee.

In carrying out the present invention I employ the following ingredients in the proportions stated: 1 raw egg; 6 teaspoonsful of sugar; $\frac{1}{2}$ teaspoonful of burnt sugar; 1/10 of 1% of benzoate of sodium.

In compounding the present invention the egg is thoroughly beaten up, and to the beaten egg is added the amount of six teaspoonsful of sugar; this composition is beaten again and one-half teaspoonful of burnt sugar and the proportionate quantity of sodium benzoate or benzoate of sodium is added until the mass has assumed a liquid state. This is left standing for two days, or until it settles, and it is found that the mass combined as described makes a total of sixteen teaspoonsful of clearing compound.

In the use of the compound one heaping teaspoonful is used to each quart of coffee in proportion, and when the coffee is poured it is found to be free of all sediment and clear. The advantage of the compound over the use of egg alone or egg and unburnt sugar is that the coffee is cleared of the stringy matter caused by the egg albumen and that the burnt sugar gives the composition a good clear color. Benzoate of sodium is used as a preservative or any other suitable preventive may be used. By permitting the clearing matter or composition to stand three weeks or more, it is found that one teaspoonful will clear one-half gallon of coffee.

Having thus described my invention, I claim as new and desire to secure by Letters Patent:—

1. A coffee clearing compound, composed of eggs, unburnt sugar, burnt sugar and a preservative, combined substantially as and in the proportions specified.

2. A clearing compound for coffee or the like, embodying an egg, six teaspoonsful of sugar, one-half teaspoonful of burnt sugar and one-tenth of one per cent. of benzoate of sodium as a preservative.

3. The process of producing a coffee clearer as described, consisting in beating a raw egg, then adding the amount of six teaspoonsful of sugar, again beating the same, then adding one-half teaspoonful of burnt sugar and approximately 1/10 of 1% of benzoate of sodium, and subsequently allowing the mixture to stand until it settles.

4. The process of producing a coffee clearing compound, consisting in beating a quantity of raw eggs until the same are thoroughly beaten and light, then adding sugar in substantially proportions of six teaspoonsful to each egg, beating the eggs and sugar together with burnt sugar to the proportion of one-half teaspoonful to the same relative proportions of eggs and white sugar and then adding to the mass a quantity of benzoate of sodium to the proportion of one-tenth per cent., the mixture thus produced being light and assuming a larger volume than the volume of the ingredients before their combination.

5. A coffee clearing compound, comprising the following ingredients mixed in substantially the following proportions: an egg, six teaspoonsful of sugar and one-half teaspoonful of burnt sugar.

In testimony whereof I have signed my name to this specification in the presence of two subscribing witnesses.

JOSEPH MORLEY.

Witnesses:
JAMES MILLER,
JAMES J. SMITH.